Patented June 20, 1939

2,163,305

UNITED STATES PATENT OFFICE 2,163,305

PROCESS OF POLYMERIZING ACRYLIC AND ALKACRYLIC COMPOUNDS

Harry R. Dittmar, Wilmington, Del., assignor to E. I. du Pont de Nemours & Company, Wilmington, Del., a corporation of Delaware No Drawing. Application May 21, 1935, Serial No. 22,573

17 Claims. (Cl. 260—83)

This invention relates to the production of plastic materials by polymerization and more particularly to a new and improved method of polymerizing unsaturated organic compounds, e. g., acrylic acid, methacrylic acid, their homologues, esters and other derivatives or mixtures thereof.

The control of polymerization of the above general class of compounds is rendered difficult since it is often accompanied by considerable development of heat, and, as the temperature affects the polymerization, it is difficult, by the mere direct application of heat in the presence or absence of suitable catalysts, to regulate the polymerization in order to obtain a fully polymerized product in a suitable form.

Various methods have been proposed to overcome these difficulties due to polymerization such, for example, as the emulsion polymerization processes described in British Patents 359,534 and 374,436, and the granular polymerization process disclosed in the copending U. S. applications of Crawford et al., Ser. Nos. 749,500 filed October 22, 1934, and 12,728 filed March 23, 1935. When polymerizing in accord with the processes therein disclosed, an emulsifying agent or colloid is required in order to effect dispersion of the particles during their polymerization. After the polymerization no attempt is usually made to remove the colloid or other type of emulsifying agent employed and, due to the small percentage of these agents used, thorough removal would be very difficult.

Because of the residual emulsifying agent left in the polymerized product it has been found that the value of the finished resin for many commercial uses is greatly lowered. This is particularly true when the resin is molded or otherwise shaped into a form which must have good strength. Investigation has shown that, generally speaking, the resin produced by processes not involving the use of emulsifying agents hitherto used has considerably greater strength than the resin obtained when the agent is present. However, due to the desirable physical form of the polymerized product when produced by the above processes the presence of residual emulsifying agent is practically unavoidable if this form of product is produced.

An object of the present invention is to provide a polymerization process wherein a monomeric polymerizable compound is dispersed prior to polymerization by an improved emulsifying agent. Another object of the invention is to provide a polymerization process wherein compounds are polymerized in emulsion or dispersed form and the finished resin shows none of the above disadvantages. A further object of the invention is to provide a process for the polymerization of the unsaturated organic esters and more particularly the alkyl esters of acrylic acid and alpha substituted acrylic acids, such as methacrylic acid, or their homologues or derivatives or mixtures thereof by effecting the polymerization of these compounds in the presence of starch or a starch ether as the dispersing or emulsifying agent. Another object of the invention is to provide a process for the polymerization of unsaturated compounds dispersed or emulsified by starch or a starch ether such as methyl starch, ethyl starch and the like, and subsequent to polymerization hydrolyzing the starch or starch ether by any suitable means such as by subjecting the polymer to the action of enzymatic hydrolysis. A more specific object of the invention is to provide a process for the polymerization of the esters of acrylic and methacrylic acids while in emulsified or dispersed form and in the presence of methyl starch and the subsequent hydrolysis of the methyl starch by the action of pancreatin. Other objects and advantages of the invention will hereinafter appear.

I have found that monomeric polymerizable compounds can be converted to high strength polymers, when a dispersing or an emulsifying agent, such as starch or starch ethers, has been employed if the polymerized product, which contains adsorbed to the individual particles of the polymer a considerable quantity of the starch or starch derivative, is treated in such a way that the starch or starch derivative present is hydrolyzed and subsequent to its hydrolysis the hydrolysis product may be, and preferably is, washed from the polymerized product.

The hydrolysis of the starch or starch derivatives may be effected in any suitable manner, but generally I prefer to treat the polymeric compounds while in the dispersed or emulsified form, and containing the starch or starch derivatives as dispersing or emulsifying agents, with a hydrolyzing agent which is capable of converting the starch or starch derivatives to glucose or other hydrolyzed derivative of the starch or starch derivative. For this purpose I prefer to employ the vegetable and animal amylases, which by means of enzymatic hydrolysis apparently hydrolyze the starch to the form of glucose, maltose, etc., which is readily removed by washing from the polymeric product. Specific types of hydrolyzing agents of this nature, which are particularly well adapted for use in my process, include, for example, pancreatin, amylopsin, pancreatic amylase, malt amylase, Taka-diastase, salivary amylase, leucocyte amaylase, barley amylase, potato amylase, cholam amylase, etc.

Owing to the infinite variety of starches available on the market, such as potato starch, corn starch, and like starches in general I have found that for best results ordinary starch is not as suitable as the starch ethers as a dispersing or emulsifying agent. This non-suitability is perhaps in no small part due to the varied chemical or physical constitution of these starches. Accordingly, I prefer to use modified starches such as the starch ethers either partially or fully etherified and of the starch ethers preferably the lower aliphatic ether starches, such, for example, as methyl starch, ethyl starch, propyl starch, and the like. For many purposes and particularly for the dispersion of such compounds as the alkyl methacrylates, such, for example, as methyl methacrylate, ethyl methacrylate, and the like, the methyl starches disclosed and claimed by O. R. Kreimeier and R. W. Maxwell in their pending U. S. application Ser. No. 720,076 filed April 11, 1934, are particularly well fitted These starch ethers comprise ethers having a low degree of alkylation in the neighborhood of from 0.02 to 0.75 mol of the alkylating agent per $C_6H_{10}O_5$ mol of starch.

When utilizing these starch ethers it is immaterial whether the monomeric compound be ultimately converted to the polymer as a gum-like material as the result of emulsion polymerization and ultimate coagulation, or as a granular or globular powder resulting from polymerization in granular form, for, in either instance, it will be found that if the starch ethers be used, and the latter subsequently hydrolyzed and removed, a resin having a strength equal to the strength of the polymeric resin per se is obtained.

I shall now illustrate by way of example several methods of conducting my process, but it will be understood that my invention shall not be restricted to the details therein given except as it may be limited by the claims appended hereto.

A. *Example 1.*—50 parts of acrylic acid ethyl ester are emulsified, by stirring, in 100 parts of water containing 1% of potato starch. The emulsion is heated while stirring for 12 hours and from 75–85° C., under a reflux condenser. The emulsion is freed from the last traces of the unpolymerized ester by treating with steam and after cooling to approximately 40° C., 0.1% of pancreatin, based on the weight of polymeric ethyl acrylate, is added; after about 15 minutes the product may be coagulated, if desired, by pouring into a 4% solution of hydrochloric acid, after which it may be washed to remove the hydrochloric acid, whereupon a product is obtained soluble in acetone and the lower alkyl and aryl acetates.

*Example 2.*—50 parts of styrene and 50 parts of polyacrylic acid ethyl ester are emulsified, by stirring, in 200 parts of water in the presence of 1% of methyl starch. (The methyl starch was prepared by adding with stirring 2 kilograms of corn starch to 2 litres of water. To this dispersion 150 grams of dimethyl sulfate were added together with 50 grams of sodium hydroxide and 1 litre of water during the course of 3 hours, the temperature being kept below 35° C. The product was filtered, washed with methanol and dried at 65° C.) The polymerization is effected at approximately room temperature and requires in the neighborhood of approximately 20 days to give a practically completely polymerized product; 0.05% of pancreatin in added at 40° C., and held for about 10 minutes. The product is coagulated by pouring into an aqueous 4% hydrochloric solution; it is then filtered and thoroughly washed with water. The product is soluble in usual organic solvents, such as benzene and the lower alkyl acetates, and is considerably tougher than when the starch is not hydrolyzed.

*Example 3.*—A glass-lined jacketed kettle of 50 gallons capacity provided with a stirrer and a reflux condenser was charged with 25 gallons of water and 5 gallons of monomeric methyl methacrylate containing 1% (based on weight of monomer) of benzoyl peroxide and 0.8 of 1% (based on monomer) of methyl starch containing .05 methyl groups per each $C_6H_{10}O_5$ group. A T-shaped stirrer was revolved at 550 R. P. M., giving a fairly deep vortex and the temperature raised and maintained at approximately 80° C. After approximately 1 hour the polymerization was complete and a granular polymer separated and washed with distilled water. Upon molding under a temperature of 170° C., and 3000 lbs./sq. in. a resin was obtained which when tested gave on an arbitrary scale a strength of approximately 6. The molding was also hazy due apparently to the presence of the methyl starch.

B. Another batch of methyl methacrylate was polymerized as directed in Example 3A and prior to washing was subjected to the enzymatic hydrolysis of 0.02% of pancreatin (based on the weight of polymer present) for 15 minutes at 40° C.; it was then washed and dried as in 3A. The molded resin on the same arbitrary scale as in 3A had a strength of 22 and was brilliantly clear and wholly transparent.

The treatment of the emulsified or dispersed polymer to destroy the ultimate weakening effect attributed to the starch or starch derivative may be carried out in many ways. Usually I prefer to add the vegetable or animal amylase directly to the aqueous or other liquid containing the dispersed or emulsified polymer. The amylase acts at room temperature but more rapidly at temperatures of 40° C., the time of reaction requiring in the neighborhood of from 5–25 minutes.

My process is applicable primarily to the production of polymeric compounds which are normally solid at ordinary temperature. Among the additional compounds which can be advantageously polymerized by my process are: esters, nitriles, and amides of acrylic acid, e. g., ethyl, methyl, propyl, butyl, and the higher acrylates; the esters, nitriles and amides of methacrylic acid, e. g. methyl, ethyl, propyl, butyl, and amyl methacrylates; the higher alkyl methacrylates such as nonyl, decyl, and lauryl methacrylates, the primary, secondary, and tertiary straight or branch chain saturated or unsaturated alcohol esters of methacrylic or the other alkacrylic acids; and the acids per se, i. e., acrylic acid and methacrylic acid. The above compounds may be prepared by any suitable process such, for example, as the processes disclosed in U. S. Patents 1,980,483, filed November 3, 1932; 1,993,089, filed November 10, 1933; 2,013,648, filed December 30, 1933, and 2,041,820, filed May 5, 1934. These compounds may, if desired, be polymerized alone or admixed with each other or with vinyl compounds, such, for example, as the vinyl halides, vinyl chloride, and the vinyl esters, such as vinyl monochloracetate, the solid styrols conforming generally to the formula ArCH:CH₂. In many instances the vinyl type compounds may also be advantageously polymerized in accord with my process. I have stressed the advantage of utilizing my process for the polymerization of compounds which give solid resins principally because molded products so prepared from such resins have better strength. It is to be understood, nevertheless, that my process may likewise be used, if desired, for the production of polymeric compounds which are not solids under normal conditions. The advantages of additional strength will not generally be obtained, altho that advantage may be offset by homogeneity and/or clarity of the finished resin.

In the present invention when reference is made to polymerization in the dispersed state to produce a polymer in the emulsified form or as a granular product it will be appreciated that conditions, such as quantity of dispersing agent, temperature, type, and amount of stirring, etc., are a prerequisite to the preparation of the polymer in the form desired. The starch or starch ether of my invention is used, as has been described, to affect the dispersion no matter what may be its degree.

From a consideration of the above specification it will be appreciated that many improvements and modifications of the details therein given may be made without sacrificing the advantages derived from the invention.

I claim:

1. A process for the polymerization of methyl methacrylate in which the monomeric methyl methacrylate is polymerized while in an aqueous polymerizing medium in the presence of methyl starch as the dispersing agent, the step which comprises removing methyl starch by treating the dispersed polymerized methyl methacrylate with from 0.05 to 0.5% of pancreatin based on the weight of the polymeric resin.

2. In a process for polymerizing a monomeric methyl methacrylate while dispersed in water to give a polymer in the granular form the step which comprises effecting the dispersion with methyl starch as the dispersing agent and obtaining the polymeric product in granular form.

3. In a process of polymerizing a monomeric alkacrylic acid in an emulsified state the steps which comprise emulsifying the alkacrylic acid with methyl starch as the dispersing agent, polymerizing the emulsified acid, adding an agent that will hydrolyze starch, hydrolyzing the methyl starch and subsequently coagulating and washing the product.

4. In a process of polymerizing a monomeric methyl methacrylate in a granular form the steps which comprise dispersing the methyl methacrylate with starch ether as the dispersing agent, polymerizing the dispersed ester, adding an agent that will hydrolyze starch, hydrolyzing the starch ether and subsequently coagulating and washing the product.

5. In a process of polymerizing a monomeric methyl methacrylate in a granular form the steps which comprise dispersing the methyl methacrylate with methyl starch as the dispersing agent, polymerizing the dispersed ester, adding an agent that will hydrolyze starch, hydrolyzing the methyl starch and subsequently coagulating and washing the product.

6. Process which comprises subjecting methyl methacrylate to polymerizing conditions while dispersed in water containing a dispersing agent selected from the group consisting of starch and starch ethers to give a polymeric ester in granular form; on completion of the desired polymerization, adding a hydrolyzing agent whereby the dispersing agent is rendered water soluble; and separating the thus hydrolyzed dispersing agent from the polymer as an aqueous solution.

7. Process which comprises subjecting methyl methacrylate to polymerizing conditions while dispersed in water containing a dispersing agent selected from the group consisting of starch and starch ethers; on completion of the desired polymerization, adding an enzymatic hydrolyzing agent whereby the dispersing agent is rendered water soluble; and separating the thus hydrolyzed dispersing agent from the polymer as an aqueous solution.

8. Process which comprises subjecting methyl methacrylate to polymerizing conditions while dispersed in water containing a dispersing agent selected from the group consisting of starch and starch ethers; on completion of the desired polymerization, adding pancreatin whereby the dispersing agent is rendered water soluble; and separating the thus hydrolyzed dispersing agent from the polymer as an aqueous solution.

9. Process which comprises subjecting methyl methacrylate to polymerizing conditions while dispersed in water containing a dispersing agent selected from the group consisting of starch and starch ethers; on completion of the desired polymerization, adding an enzymatic hydrolyzing agent whereby the dispersing agent is rendered water soluble; and thereafter separating and water-washing the polymeric product.

10. In a process for polymerizing monomeric alkacrylic acid compounds while dispersed in water to give a polymer in granular form, the steps which comprise effecting the dispersion with methyl starch, which has been alkylated with not more than 0.75 mol of alkylating agent per $C_6H_{10}O_5$ a mol of starch, as the dispersing agent and obtaining the polymer in granular form.

11. In a process for polymerizing monomeric methyl methacrylate while dispersed in water to give a polymer in granular form, the steps which comprise effecting the dispersion with a starch ether which contains from approximately 0.02 to 0.75 mol of alkylating agent per $C_6H_{10}O_5$ mol of starch, as the dispersing agent and obtaining the polymer in granular form.

12. In a process for polymerizing monomeric methyl methacrylate while dispersed in water to give a polymer in granular form, the steps which comprise effecting the dispersion with methyl starch containing from approximately 0.02 to 0.75 mol of methylating agent per $C_6H_{10}O_5$ mol of starch and obtaining the polymer in granular form.

13. In a process for polymerizing monomeric acrylic acid esters while dispersed in water to give a polymer in granular form, the step which comprises effecting the dispersion with a starch ether as the dispersing agent.

14. In a process for polymerizing a monomeric alkyl methacrylate while dispersed in water to give a polymer in granular form, the step which comprises effecting the dispersion with a methyl starch as the dispersing agent.

15. Process which comprises subjecting an alkyl methacrylate to polymerizing conditions while dispersed in water containing a dispersing agent selected from the group consisting of starch and starch ethers to give a polymeric ester in granular form; on completion of the desired polymerization, adding a hydrolyzing agent to the polymer whereby the dispersing agent is rendered water soluble; and separating the thus hydrolyzed dispersing agent from the polymer as an aqueous solution.

16. In a process for the polymerization of an alkyl methacrylate in which the monomeric alkyl methacrylate is polymerized while dispersed in an aqueous polymerizing medium in the presence of methyl starch as the dispersing agent, the step which comprises removing methyl starch by treating the polymerized alkyl methacrylate with from 0.05 to 0.5% of an enzymatic hydrolyzing agent based on the weight of polymeric resin.

17. In a process of polymerizing, while dispersed in water, a monomeric organic acid compound selected from the group consisting of acrylic acid and its esters, nitriles and amides and alkacrylic acids and their esters, nitriles and amides, the step which comprises effecting the dispersion in the presence of a starch ether as the dispersing agent.

HARRY R. DITTMAR.